(12) United States Patent
Vielcanet et al.

(10) Patent No.: US 10,273,826 B2
(45) Date of Patent: Apr. 30, 2019

(54) LUBRICATION DEVICE FOR A TURBINE ENGINE

(71) Applicant: SNECMA, Paris (FR)

(72) Inventors: Jérémy Vielcanet, Moissy Cramayel (FR); Caroline Frantz, Moissy Cramayel (FR); Antoine Laigle, Moissy Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 373 days.

(21) Appl. No.: 15/037,409

(22) PCT Filed: Nov. 7, 2014

(86) PCT No.: PCT/FR2014/052856
§ 371 (c)(1),
(2) Date: May 18, 2016

(87) PCT Pub. No.: WO2015/075348
PCT Pub. Date: May 28, 2015

(65) Prior Publication Data
US 2016/0290162 A1    Oct. 6, 2016

(30) Foreign Application Priority Data

Nov. 20, 2013 (FR) ................................... 13 61408

(51) Int. Cl.
*F01D 25/18* (2006.01)
*F04D 25/04* (2006.01)
(Continued)

(52) U.S. Cl.
CPC ............... *F01D 25/18* (2013.01); *F01D 5/02* (2013.01); *F01D 15/12* (2013.01); *F02C 7/06* (2013.01);
(Continued)

(58) Field of Classification Search
CPC . F01D 15/12; F01D 25/18; F02C 7/06; F05D 2260/40311; G05D 13/10–13/14; G05D 13/34–13/38
See application file for complete search history.

(56) References Cited

U.S. PATENT DOCUMENTS 2,374,434 A * 4/1945 Jensen ................... G05D 13/00
                                                                 192/104 R
2,669,093 A    2/1954 Lee, II
(Continued)

FOREIGN PATENT DOCUMENTS

GB            106824 A        3/1918
GB           1122285 A        8/1968

*Primary Examiner* — Jason D Shanske
*Assistant Examiner* — Brian O Peters
(74) *Attorney, Agent, or Firm* — Blank Rome LLP

(57) ABSTRACT

The invention relates to a lubrication device for a turbine engine, comprising an oil intake pipe (23) provided with a pump (24) for supplying oil and control means (30) located downstream from the supply pump (24), a supply pipe (26) intended for supplying oil to a member to be lubricated and a recirculation pipe (27) connected upstream from the supply pump (24), the control means (30) making it possible to direct all or part of the flow of oil from the intake pipe (23) towards the supply pipe (26) and/or towards the recirculation pipe (27).

7 Claims, 3 Drawing Sheets

(51) Int. Cl.
  *F04D 29/32* (2006.01)
  *F01D 5/02* (2006.01)
  *F01D 15/12* (2006.01)
  *F02C 7/06* (2006.01)

(52) U.S. Cl.
  CPC ......... *F04D 25/045* (2013.01); *F04D 29/321* (2013.01); *F05D 2220/30* (2013.01); *F05D 2240/60* (2013.01); *F05D 2260/40311* (2013.01); *F05D 2270/58* (2013.01)

(56) References Cited

U.S. PATENT DOCUMENTS

| | | | |
|---|---|---|---|
| 5,234,014 A | 8/1993 | Queitzsch, Jr. | |
| 8,075,261 B2 * | 12/2011 | Merry | F01D 9/041 415/201 |
| 9,057,326 B2 * | 6/2015 | Charier | F02C 3/067 |
| 2009/0081035 A1 * | 3/2009 | Merry | F01D 9/041 415/208.1 |
| 2011/0311361 A1 * | 12/2011 | Charier | F02C 3/067 416/129 |

* cited by examiner

LUBRICATION DEVICE FOR A TURBINE ENGINE

The present invention relates to a lubrication device for a turbine engine, such as for instance the turbine engine on a plane.

The invention more particularly applies to an «open rotor» turbine engine, i.e. comprising a not ducted fan.

Such a turbine engine, more particularly known from the patent application FR 2 940 247, conventionally comprises a high pressure body comprising a high pressure compressor and a high pressure turbine rotationally coupled by means of a first shaft and an additional body comprising a low pressure compressor and an intermediate pressure turbine rotationally coupled by means of a second shaft.

The turbine engine further comprises a free power turbine, forming a low pressure turbine and comprising a first rotor (or internal rotor) and a second rotor (or external rotor). The turbine engine also comprises a system of contra-rotating impellers, i.e. a first impeller and a second impeller respectively driven by the low pressure turbine via an epicyclic speed reduction gear. The impeller system also comprises a stator.

The epicyclic speed reduction gear more particularly comprises a planet gear rotating about an axis, meshing with satellites about axes belonging to a planet carrier, with the planets meshing with a radially toothed external crown gear, itself supported by a crown gear shaft. The shaft of the crown gear is rotationally coupled with the second rotor. Besides, the shaft of the planet gear is rotationally coupled with the first rotor.

Additionally, the shaft of the planet carrier is rotationally coupled with the first impeller and the shaft of the crown gear is rotationally coupled with the second impeller.

The turbine engine comprises an oil system lubricating and cooling the epicyclic speed reduction gear and the bearings supporting the rotating parts. Such system comprises an oil intake pipe provided with a pump for supplying oil and if need be control means located downstream from the supply pump, a supply pipe intended for supplying oil to a member to be lubricated and a recirculation pipe connected upstream from the supply pump, with the control means making it possible to direct all or part of the flow of oil from the intake pipe towards the supply pipe and/or towards the recirculation pipe. The fixed displacement pump is driven into rotation by a mobile member of an accessory gear box positioned close, via a power shaft.

Considering the footprint constraints, connecting a power shaft (i.e. a shaft making it possible to transmit a relatively high torque, for instance ranging from 90 to 900 N·m) with a mobile member of the epicyclic speed reduction gear is relatively complicated. Now, driving into rotation such oil supply pump cannot be obtained but with a power shaft.

It is reminded that an accessory gear box, or A.G.B. comprises a box containing a certain number of gears connected to items of equipment or accessories, such as for instance an electric generator, a starter, an alternator, hydraulic fuel or oil pumps, etc. . . . . In order to drive such different gears, a part of the power of the turbine engine is taken at the high pressure body by a power take-off shaft. The speed of rotation of the various mobile members of the accessory gear box directly depends on the speed of rotation of the high pressure body of the turbine engine.

On the contrary, the speed of rotation of the various mobile members of the epicyclic speed reduction gear is not directly dependent on the speed of rotation of the high pressure body, but is directly dependent on the speed of rotation of the rotors of the low pressure turbine. The oil requirements of the speed reduction gear are thus uncoupled from the speed of rotation of the high pressure body. The oil system, and more particularly the pump, has a capacity covering the maximum oil rate required, and thus supercharges the epicyclic speed reduction gear with oil out of the operation point for which the capacity of the pump has been designed. Such supercharging is combined with a limited capacity of discharging oil because of the speed reduction gear, more particularly at low rotation speed (oil discharge by centrifugal effect). The risk of flooding the speed reduction gear exists, which affects the operation, the performances and the service life thereof, generates heating and creates unbalance.

In order to remedy such problem, the above-mentioned control means may comprise a valve electrically driven by a computer, according to the speed of the low pressure turbine, so as to reduce the rate of oil supplied to the speed reduction gear if need be.

Such electronic or electric control means are of the «active» type, i.e. they require a special event (for instance a set-point) and may then generate troubles. A need thus exists for improving the reliability and strength of such control means.

The invention more particularly aims at providing a simple, efficient and cost-effective solution to this problem.

For this purpose, it provides for a lubrication device for a turbine engine, comprising an oil intake pipe provided with a pump for supplying oil and control means located downstream from the supply pump, a supply pipe intended for supplying oil to a member to be lubricated and a recirculation pipe connected upstream from the supply pump, with the control means making it possible to direct all or part of the flow of oil from the intake pipe towards the supply pipe and/or towards the recirculation pipe, with the pump being driven by at least one rotating member of an accessory gear box of the turbine engine, characterized in that the control means comprise a translationally mobile member the position of which makes it possible to adapt the oil rates sent to the supply pipe and to the recirculation pipe respectively, with said mobile member being coupled to a centrifugal governor able to modify the position of said mobile member according to the speed of rotation of an input shaft of the governor.

The control means are thus of the mechanical type, which makes it possible to enhance the resistance and reliability thereof. The pump is driven by a rotating member of the accessory gear box or A.G.B. for instance through a power shaft. It should be noted that, in the case of the A.G.B., the footprint constraints are not so high than in the case of the speed reduction gear. A high torque can thus be taken at the A.G.B. through a power shaft in order to drive the pump. It should also be noted that the driving the centrifugal governor into rotation requires a relatively low torque.

The centrifugal governor preferably comprises:
a rotating input shaft,
a translationally mobile output member connected with the control means mobile member,
a first and a second link each comprising a first and a second end, with the first ends of the first and second links being mutually articulated at a first pivot member which can be translationally moved in parallel with the rotating input shaft,
a third and a fourth link each comprising a first and a second end, with the first ends of the third and fourth links being respectively articulated on the second ends of the first and second links respectively at a second and a third pivot member, with the second ends of the third and fourth links being mutually articulated at a fourth pivot member which is stationary relative to the rotating input shaft, a fifth and a six link each comprising a first and a second end, with the first ends of the fifth and six links being mutually articulated at the fourth pivot member, a seventh and an eighth link each comprising a first and a second end, with the first ends of the seventh and eighth links being respectively articulated on the second ends of the fifth and six links respectively at a fifth and a sixth pivot member, with the second ends of the seventh and eighth links being mutually articulated at a seventh pivot member which can be translationally moved in parallel with the rotating input shaft, at least one of the second, third, fifth and sixth pivot members comprising at least one weight, the translationally mobile output member being connected with the first and/or the seventh pivot members.

The first, fourth and seventh pivot members are preferably mounted rotating along the rotating input shaft of the centrifugal governor.

In this case, at least one return elastic member is so arranged as to move the first pivot member away from the fourth pivot member and/or to move the fourth pivot member away from the seventh pivot member.

Besides, the control means may comprise at least one mobile slide valve, with the position of the valve making it possible to adapt the oil rates directed to the supply pipe and to the recirculation pipe respectively.

The invention also relates to a turbine engine characterized in that it comprises a lubrication device mentioned above, a first and a second contra-rotating impeller driven into rotation by a low pressure turbine, through an optionally epicyclic speed reduction gear, with the governor input shaft being driven into rotation by one element of the speed reduction gear or the low pressure turbine, with the supply pipe being intended to supply the speed reduction gear with oil.

In this case, the position of the mobile output member of the centrifugal governor depends on the speed of rotation of the above-mentioned input shaft, with the output member of the governor being coupled with the mobile member of the control means.

The centrifugal governor is thus driven by the low pressure turbine or the epicyclic gear (belonging to the «Power Gear Box» or P.G.B.), using a shaft intended to transmit a low torque and thus requiring smaller overall dimensions.

The turbine engine may preferably comprise a high pressure body comprising a high pressure compressor and a high pressure turbine rotationally coupled by a first shaft, and an additional body comprising a low pressure compressor and an intermediate pressure turbine, rotationally coupled by a second shaft, with the speed of rotation of the accessory gear box rotating member depending on (being a multiple of) the speed of rotation of the shaft of the high pressure body.

The invention will be better understood, and other details, characteristics and advantages of the invention will appear upon reading the following description given by way of a non restrictive example while referring to the appended drawings wherein.

Figure 1:
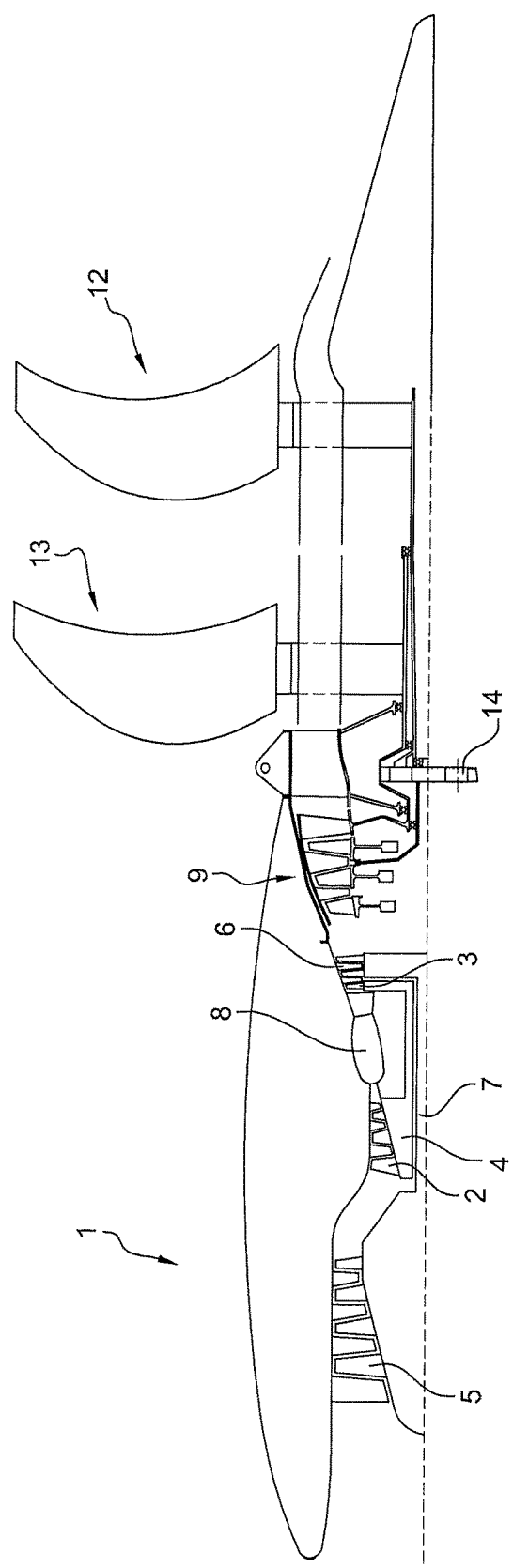
FIG. 1 is a half-view, in longitudinal cross-section, of a turbine engine with a not ducted fan of the prior art.
Figure 2:
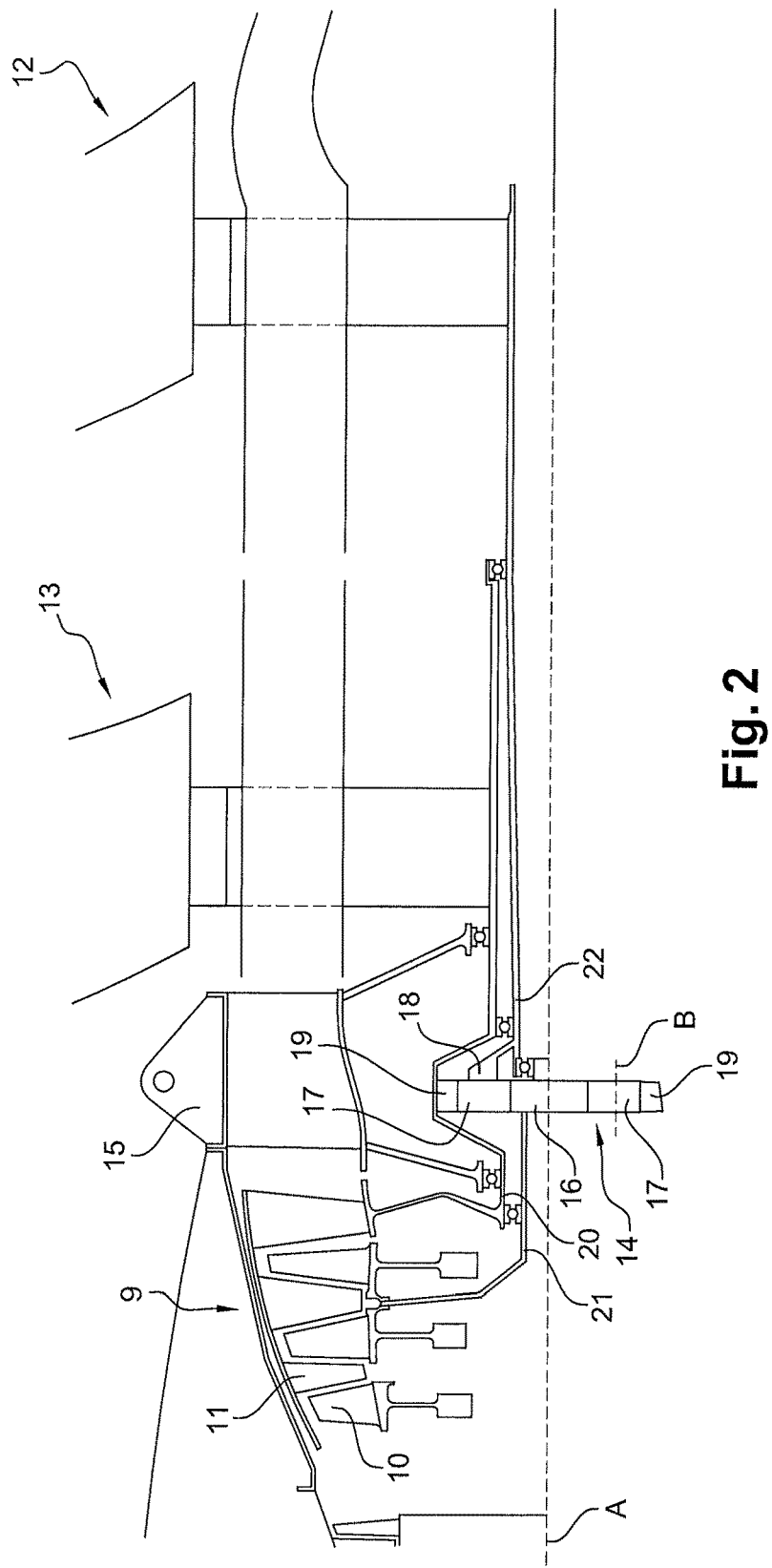
FIG. 2 is a detailed view of a part of FIG. 1.
Figure 3:
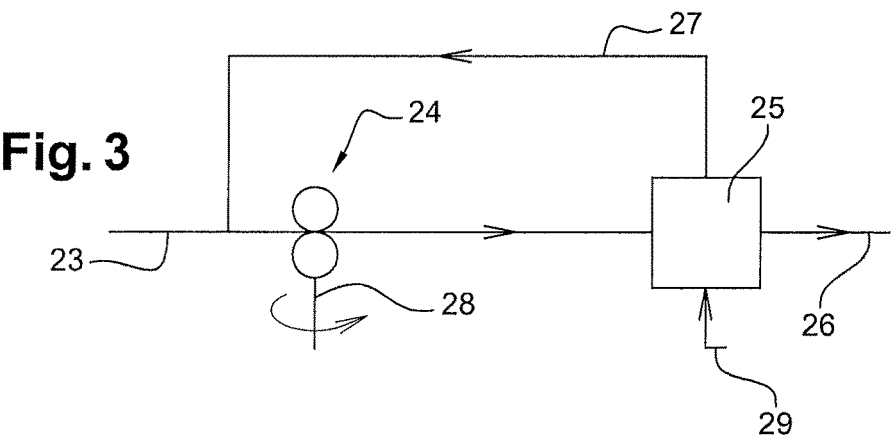
FIG. 3 is a schematic view of a lubrication device of the prior art.

FIGS. 1 and 2 show a so-called «open rotor» turbine engine with a not ducted fan, known from document FR 2940247. It comprises a high pressure body comprising a high pressure compressor 2 and a high pressure turbine 3 rotationally coupled by means of a first shaft 4 and an additional body comprising a low pressure compressor 5 and an intermediate pressure turbine 6 rotationally coupled by means of a second shaft 7. A combustion chamber 8 is positioned between the high pressure compressor 2 and the high pressure turbine 3.

The turbine engine 1 further comprises a free power turbine 9, forming a low pressure turbine and comprising a first rotor 10 (or internal rotor) and a second rotor 11 (or external rotor), to be seen in FIG. 2. The turbine engine 1 also comprises a system of contra-rotating impellers, i.e. a first impeller 12 and a second impeller 13 respectively driven by the low pressure turbine 9 via an epicyclic speed reduction gear 14. The impeller system also comprises a stator 15.

The epicyclic speed reduction gear 14 more particularly comprises a planet gear 16 rotating about the axis A of the turbine engine, meshing with satellites 17 about axes B belonging to a planet carrier 18, with the planets 17 meshing with a radially toothed external crown gear 19, itself supported by a crown gear shaft 20. The shaft 20 of the crown gear 19 is rotationally coupled with the second rotor 11. Besides, the shaft 21 of the planet gear 16 is rotationally coupled with the first rotor 10.

Besides, the shaft 22 of the planet carrier 18 is rotationally coupled with the first impeller 12 and the shaft 20 of the crown gear is rotationally coupled with the second impeller 13.

The turbine engine 1 comprises an oil system more particularly providing lubrication and cooling the epicyclic speed reduction gear 14. Such system conventionally comprises an oil intake pipe 23 connected upstream with a tank 23a and provided with a pump 24 for supplying oil and control means 25 located downstream from the supply pump 24, a supply pipe 26 intended for supplying oil to the speed reduction gear 14 and a recirculation pipe 27 for instance connected upstream from the supply pump 24, with the control means 25 making it possible to direct all or part of the flow of oil from the intake pipe 23 towards the supply pipe 26 and/or towards the recirculation pipe 27. The fixed displacement pump 24 is driven into rotation by a mobile member of an accessory gear box (not shown), positioned close thereto, via a power shaft 28. As seen above, the speed of rotation of the various mobile members of the accessory gear box directly depends on (i.e. is a multiple of) the speed of rotation of the high pressure body of the turbine engine.

The above-mentioned control means comprise a valve 25 electrically driven by a computer, according to the speed of the low pressure turbine, so as to reduce the rate of oil supplied to the speed reduction gear 14 if need be.

Such electronic or electric control means are of the «active» type, i.e. they require a special event (for instance a set-point 29) and may then generate troubles. A need thus exists for improving the reliability and strength of such control means 25.

Figure 4:
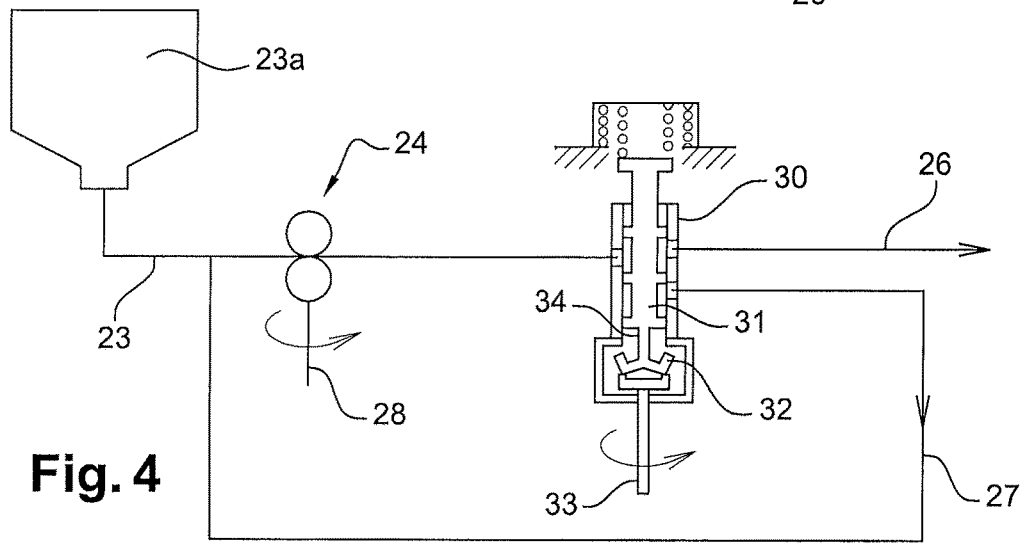
FIG. 4 is a schematic view of a lubrication device according to the invention.
Figure 5:
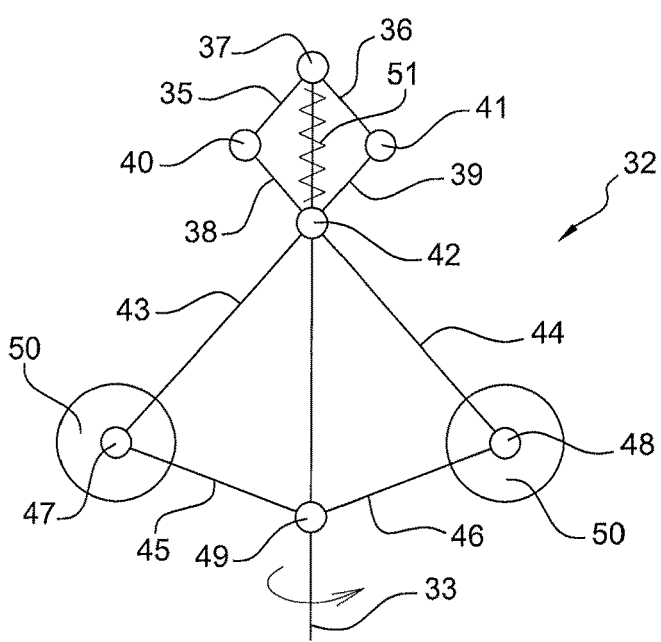
FIG. 5 is a schematic view of the centrifugal governor of the device according to the invention.

For this purpose, and as illustrated in FIG. 4, one embodiment of the invention provides for substituting the solenoid valve 25 with a slide valve 30 comprising a translationally mobile member, for instance a slide 31, the position of which makes it possible to adapt the rates of the oil sent to the supply pipe and to the recirculation pipe. The mobile member 31 is coupled with a centrifugal governor 32 (best seen in FIG. 5) able to modify the position of said mobile member 31 according to the speed of rotation of an input shaft 33 of the governor 32.

The centrifugal governor 32 more particularly comprises:
the rotating input shaft 33,
a translationally mobile output member 34 connected with the slide valve 30 mobile member 31,
a first and a second link 35, 36 each comprising a first and a second end, with the first ends of the first and second links 35, 36 being mutually articulated at a first pivot member 37 which can be translationally moved in parallel with the rotating input shaft 33,
a third and a fourth link 38, 39 each comprising a first and a second end, with the first ends of the third and fourth links 38, 39 being respectively articulated on the second ends of the first and second links 35, 36 respectively at a second and a third pivot member 40, 41, with the second ends of the third and fourth links 38, 39 being mutually articulated at a fourth pivot member 42 which is stationary relative to the rotating input shaft 33,
a fifth and a six link 43, 44 each comprising a first and a second end, with the first ends of the fifth and six links 43, 44 being mutually articulated at the fourth pivot member 42,
a seventh and an eighth link 45, 46 each comprising a first and a second end, with the first ends of the seventh and eighth links 45, 46 being respectively articulated on the second ends of the fifth and six links 43, 44 respectively at a fifth and a sixth pivot member 47, 48, with the second ends of the seventh and eighth links 45, 46 being mutually articulated at a seventh pivot member 49 which can be translationally moved in parallel with the rotating input shaft 33, At least one of the second, third, fifth and sixth pivot members 40, 41, 47, 48 (here the pivot members 47 and 48) comprises at least one weight 50 (here two weights 50, i.e. one on each pivot member 47 and 48). Besides, the governor 32 output member 34 is connected with the first and/or seventh sliding pivot members 37, 49.

A return elastic member, such as, for instance, a coil compression spring 51, is so arranged as to move the first pivot member 37 away from the fourth pivot member 42, and so as to consequently also move the seventh pivot member 49 away from the fourth pivot member 42, because of the connections between the links 35, 36, 38, 39, 43, 44, 45, 46.

The governor 32 input shaft 33 is driven into rotation by one element of the epicyclic speed reduction gear 14 or the low pressure turbine 9.

Thus, in operation, the weights 50 are moved away, by centrifugal effect, from the axis of rotation 33, thus causing the mobile output member 34 and the governor 30 mobile member 31 to move.

The position of the governor 30 mobile member 31 and therefore, the rate of the oil supplying the speed reduction gear 14 thus depend on the speed of rotation of said speed reduction gear 14. All risks of supercharging the speed reduction gear 14 is thus avoided and therefore, the operation thereof is improved.

Besides, such control means of the «passive» type are relatively reliable as compared to controlled solenoid valves for instance.

Of course, the invention is not limited to the field of turbine engines of the «open rotor» type but can also be applied to other turbine engines comprising a speed reduction gear, such as a turboprop engine or a turbojet engine with a speed reduction gear.

The invention claimed is:

1. A lubrication device for a turbine engine, comprising an oil intake pipe provided with a supply pump for supplying oil and control means located downstream from the supply pump, a supply pipe configured to supply oil to a speed reduction gear to be lubricated and a recirculation pipe connected upstream from the supply pump, the control means making it possible to direct all or part of the flow of oil from the intake pipe towards the supply pipe and/or towards the recirculation pipe, with the supply pump being driven by at least one rotating member of an accessory gear box of the turbine engine, wherein the control means comprise a translationally mobile member, the position of which makes it possible to adapt the oil rates sent to the supply pipe and to the recirculation pipe respectively, with said mobile member being coupled to a centrifugal governor able to modify the position of said mobile member according to the speed of rotation of an input shaft of the governor.

2. The lubrication device according to claim 1, wherein the centrifugal governor comprises:
the input shaft which comprises a rotating input shaft,
a translationally mobile output member connected to the control means mobile member,
a first and a second link each comprising a first and a second end, with the first ends of the first and second links being mutually articulated at a first pivot member which can be translationally moved in parallel with the rotating input shaft,
a third and a fourth link each comprising a first and a second end, with the first ends of the third and fourth links being respectively articulated on the second ends of the first and second links respectively at a second and a third pivot member, with the second ends of the third and fourth links being mutually articulated at a fourth pivot member which is stationary relative to the rotating input shaft,
a fifth and a six link each comprising a first and a second end, with the first ends of the fifth and six links being mutually articulated at the fourth pivot member,
a seventh and an eighth link each comprising a first and a second end, with the first ends of the seventh and eighth links being respectively articulated on the second ends of the fifth and six links respectively at a fifth and a sixth pivot member, with the second ends of the seventh and eighth links being mutually articulated at a seventh pivot member which can be translationally moved in parallel with the rotating input shaft,
at least one of the second, third, fifth and sixth pivot members comprising at least one weight, with the translationally mobile output member being connected with the first and/or the seventh pivot members.

3. The lubrication device according to claim 2, wherein at least one return elastic member is so arranged as to move the first pivot member away from the fourth pivot member and/or to move the fourth pivot member away from the seventh pivot member.

4. The lubrication device according to claim 1, wherein the control means comprise at least a mobile slide valve, with the slide position making it possible to adapt the oil rates sent to the supply pipe and to the recirculation pipe, respectively.

5. A turbine engine comprising the lubrication device according to claim 1, a first and a second contra-rotating impeller driven into rotation by a low pressure turbine, through the speed reduction gear, with the governor input shaft being driven into rotation by one element of the speed reduction gear or the low pressure turbine.

6. The turbine engine according to claim 5, further comprising a high pressure body comprising a high pressure compressor and a high pressure turbine rotationally coupled by a first shaft, and an additional body comprising a low pressure compressor and an intermediate pressure turbine, rotationally coupled by a second shaft, with the speed of rotation of the accessory gear box rotating member depending on the speed of rotation of the shaft of the high pressure body.

7. The lubrication device according to claim 1, wherein the speed reduction gear comprises an epicyclic speed reduction gear.

\* \* \* \* \*